United States Patent Office 2,907,691
Patented Oct. 6, 1959

2,907,691

FUNGICIDAL PREPARATIONS

Gilbert Spencer Hartley, Fulbourn, and Peter Owen Park, Stapleford, England, assignors to Fisons Pest Control Limited, Bourn, England No Drawing. Application February 8, 1957
Serial No. 638,896

Claims priority, application Great Britain
February 24, 1956

12 Claims. (Cl. 167—42)

The invention concerns an improvement in agricultural chemical compositions which are insoluble or only slightly soluble in water and a method for using same.

When such biologically active compounds are intended to be sprayed onto plants, it is usual to add to the compositions a certain amount of surface active agents in order to promote the formation of a fine and stable aqueous suspension and to assure that the sprayed suspension wets the leaf and spreads evenly on it. Wetting and suspending agents as used for this purpose include for example metal soaps, sulphuric acid and sulfonic acid derivatives of hydrocarbons, quaternary nitrogen compounds, polyetheneoxy compounds and cellulose sulphite waste liquors. Such agents applied singly or several together, serve the purpose of stabilising a sprayable dispersion and of securing a good coverage of the leaves quite satisfactorily. But their continued presence in the composition after spraying has the rather unwanted effect of causing the active compound to be easily washed off the leaves by rain. To counteract this a sticking agent is required, starch or glue in various stages of degradation being most commonly used.

It has now been found that a certain group of compounds can be made to act both as dispersing agents (this term also includes wetting and spreading agents), and also as sticking agents, although the properties required of a wetting agent would seem irreconcilable with those of a sticking agent. The compounds in question are the salts of a volatile base and a long chain aliphatic carboxylic acid, excluding unsaturated acids without at least two double bonds.

Accordingly the present invention is for a composition containing an agricultural chemical which is insoluble or slightly soluble in water which also contains the salt of a volatile base and a long chain saturated aliphatic carboxylic acid, or a long chain unsaturated aliphatic carboxylic acid with at least two double bonds.

More particularly the present invention is directed to a composition and a process for using said composition. The process is one for the treatment of plants which comprises spraying the plants with an aqueous suspension consisting essentially of water, a substantially water-insoluble solid agricultural chemical and the salt of a volatile base selected from the group consisting of ammonia, trimethylamine and triethylamine, and an acid containing from 12 to 18 carbon atoms selected from the group consisting of a saturated aliphatic carboxylic acid and an aliphatic acid having at least 2 double bonds, said salts constituting from 2 to 100% by weight of said agricultural chemical.

The salt of the volatile base and the carboxylic acid will be hydrolysed to a small extent in aqueous solution, and an excess of the volatile base will normally be required to keep the hydrolysis in check. The dissolved salts will perform their function as suspending and wetting agents as long as they are present substantially in the salt form. After spraying, the excess volatile base evaporates with the water and hydrolysis then continues until only the free acids are left behind which will then form a water insoluble adhesive layer on the sprayed surface and thereby perform the function of stickers, whereas no agent is left at this stage to perform the now undesirable role as wetting agent.

The compositions according to the present invention may be aqueous suspensions containing the agricultural chemical and the salt of a volatile base and a long chain aliphatic carboxylic acid as identified suitably diluted for spraying on to a crop. The compositions may also be concentrates for storage and sale in the form of more or less stiff pastes intended to be diluted to spray strength on the spot. The compositions may even be dry powders where the chemical nature of the salt of a volatile base and a long chain aliphatic carboxylic acid as identified makes their reduction to dryness without decomposition possible. The compositions of the invention may of course contain in addition inert diluents and other compounds common in spray liquids such as suspending agents, anti-fluocculants and the like.

The agricultural chemical which is insoluble or slightly soluble in water may comprise a fungicide, pesticide, herbicide, plant growth regulant or other chemical used to ensure plant health. According to a preferred embodiment the agricultural chemical is a fungicide copper compound such as cuprous oxide or copper oxychloride. The present invention however is not restricted to such compounds and may contain for example other fungicides such for example as the organo sulphur fungicides for example zinc ethylene bisdithiocarbamate and tetramethylthiuram disulphide or insecticides such for example as DDT, aldrin (1:2:3:4:10:10-hexachloro-1:4:4a:5:8:8a-hexahydro-1:4:-endo, exo-5:8 dimethanonaphthalene) and dieldrin (1:2:3:4:10:10:-hexachloro-6:7-epoxy 1:4:4a:5:6:7:8:8a-octahydro-1:4:- endo, exo-5:8-dimethanonaphthalene), or herbicides such as m-parachlorphenyl-NN'-dimethylurea, or plant growth regulants such as maleic hydrazide.

The long chain saturated aliphatic carboxylic acid may comprise for example an acid which is solid at normal temperatures preferably containing at least 13 carbon atoms in the chain such as myristic acid, palmitic acid and stearic acid. The long chain unsaturated aliphatic carboxylic acid with at least two double bonds may comprise an acid which is able to form a resinous layer when in contact with air. Carboxylic acids which it has been found preferable to use include stearic acid, and the linseed oil acids, that is linoleic acid and linolenic acids.

The volatile base may comprise ammonia or an amine with a low dissociation constant and a high vapour pressure at normal temperature. It is preferred to employ as the volatile base ammonia, trimethylamine or triethylamine. The said salt of a volatile base and a long chain aliphatic acid is suitably prepared by treating the acid with an excess of a strong aqueous solution of the volatile base. The excess of volatile base employed is preferably at least 5% and is suitably in the range of 10%–100% excess over the acid equivalent.

The said salt of a volatile base and a long chain aliphatic acid may be incorporated in the agricultural composition in amounts over a wide range, for example in amount comprising from 2% to 100% by weight of the weight of the agricultural chemical. It is preferred normally to incorporate the said salt in amount comprising 10–20% by weight of the weight of the agricultural chemical.

The present invention relates particularly to compositions containing fungicidal copper compounds such as cuprous oxide and copper oxychloride. In order to be effective, as for example, for the control of potato blight, these fungicides must not only spread evenly on the leaves but also remain on the leaves over many weeks. This cannot be achieved with stickers of the conventional kind, such as starch, especially in a rainy season and as a result spraying has to be repeated in intervals of for example two weeks during the whole season to secure reasonable control. It has now been found that with formulations according to the present invention containing the salt of a volatile base and a carboxylic acid as identified the fungicide remains firmly stuck to the leaves and is not readily washed off by rain. As a result spraying needs to be done once or repeated only at longer intervals, with much saving of labour and material.

It is often desirable to add to the mixture also a small amount of deflocculant which prevents the fine suspended particles from agglomeration into larger particles. A useful deflocculant is dinaphthylmethane disulphonate.

When hard water is used for making up concentrated or diluted sprays according to the present invention there is a danger of insoluble calcium and magnesium salts being formed of the long chain aliphatic carboxylic acid. This can be prevented by incorporating in the composition a nonionic or anionic surface active agent capable of dispersing such metal soaps. Such suitable surface active agents include for example alkyl-polyethyleneglycol ethers, alkylphenyl polyethyleneglycol ethers, polyethylene glycol oleate and sodium dioctylsulphosuccinate.

The following examples are given to illustrate the present invention. The percentages quoted are by weight unless otherwise indicated.

*Example 1*

A paste was prepared of the following components:

Copper oxychloride _____ 1,000 gms.
Stearic acid _____ 100 gms.
Dinaphthylmethanedisulphonate_ 10 gms.
Trimethylamine _____ 42 gms.=2 equivalents for each mol equivalent stearic acid.
Water to make 3 litres.

The trimethylamine in the form of a 40% w./v. aqueous solution is first mixed with the stearic acid when a stiff paste of trimethylammonium stearate is formed. This is stirred into the mixture of copper oxychloride, dinaphthylmethane-disulphonate and water, and a stirrable and uniform paste is formed which on dilution with more water forms an aqueous suspension that will not settle down for a considerable time, even when left standing without stirring. When diluted to spraying concentration the suspension runs freely from the tank through the pump and spray nozzles without leaving deposits on the walls of the tank, the pipes and nozzles. After spraying there remains on the leaves a thin continuous layer of stearic acid embedding the copper oxychloride particles.

*Example 2*

A 1% solution of trimethylammonium salt of the linseed oil acids containing 1% copper oxychloride was sprayed onto glass slides and sticking was observed after one hour with the copper compound firmly attached. The slides became almost unwettable.

Solely by way of comparison the same spraying test was carried out with a solution of 1% trimethylammonium oleate and 1% copper oxychloride and no sticking became observable after four hours, and even the next day the copper compound could be washed off.

*Example 3*

A preparation was made containing 5% copper oxychloride, 1% of trimethyl ammonium stearate, and 0.05 of dinaphthylmethane-disulphonate. The trimethylamine was present in 25% excess over the amount equivalent to the acid. The mixtures were sprayed on to French beans. When half an hour after spraying and several times after this at certain intervals the treated leaves were sprayed with a jet of water, practically none of the copper compound was removed from the leaves.

*Example 4*

Aqueous suspensions were made up containing 5% copper oxychloride and 0.05% dinaphthylmethane-disulphonate and in addition 0.5% of one of the following salts: ammonium stearate; trimethylammonium stearate; triethylammonium stearate; ammonium salt of linseed oil acids; trimethyl-ammonium salt of linseed oil acids and triethylammonium salt of linseed oil acids. The suspensions were sprayed on to French beans and a washing off test was made as in Example 1. The results are contained in the following table:

| Compounds used | Complete adhesion achieved after— |
| --- | --- |
| Ammonium stearate | 2 hours. |
| Trimethylammonium stearate | 1 hour. |
| Triethylammonium stearate | ½ hour. |
| Ammonium salt of linseed oil acids | 2 hours. |
| Trimethylammonium salt of linseed oil acids | 2 hours. |
| Triethylammonium salt of linseed oil acids | 2 hours. |

Similar tests were made on tomatoes, field beans, tea and cocoa. The length of time required for the setting of the adhesive layer varied but was in no case more than 2 hours after spraying.

Solely by way of comparison similar spray liquids were prepared containing starch instead of the wetter-stickers of the invention, and sprayed in the same way on to French beans. No formation of an adhesive layer was observed; and when a water jet was applied to the leaves at various intervals after spraying the copper compound was washed off in every case.

*Example 5*

French beans were sprayed with a spray liquid containing 5% copper oxychloride, 0.5% trimethylammonium stearate and 0.05% dinaphthylmethanedisulphonate. Application of artificial rain equivalent to 14 inches in 11 hours by means of a hand spray attached to the water tap giving a fine droplet low velocity rainfall roughly equivalent to 1 inch rain per hour, and being equivalent to monsoon rainfall, caused no observable loss of copper oxychloride.

*Example 6*

French beans were sprayed with a liquid containing 5% copper oxychloride, 0.5% triethylammonium salt of linseed oil acids, and 0.05% dinaphthylmethane-disulphonate. Artificial rain equivalent to 13½ inches in 10 hours applied as indicated in Example 5 did not remove any copper oxychloride.

*Example 7*

Tea plants were sprayed with a liquid containing 5% copper oxychloride, 0.5% triethylamine stearate and 0.05% dinaphthylmethane-disulphonate. Artificial rain equivalent to 12 inches in 8½ hours applied as described in Example 5 did not remove any copper oxychloride.

Solely by way of comparison check tests were carried out with a spray liquid as identified in the preceding Examples 5–7 but replacing the salt of the volatile base and the carboxylic acid with starch, the tests otherwise being carried out as shown in the examples, resulted in most of the copper oxychloride being washed away by the artificial rain.

We claim:
1. A composition consisting essentially of a solid fungicide which is substantially water insoluble and the salt of a volatile base and a long chain aliphatic carboxylic acid containing from 12 to 18 carbon atoms, said volatile base being selected from the group consisting of ammonia, trimethylamine and triethylamine; said acid being selected from the group consisting of saturated acids and acids containing at least two double bonds; and said salt being present in an amount from 2 to 100% by weight of the fungicide.

2. A composition according to claim 1 wherein the long chain aliphatic carboxylic acid is linoleic acid.

3. A composition according to claim 1 wherein the long chain aliphatic carboxylic acid is linolenic acid.

4. A composition as claimed in claim 1 wherein the fungicide is a fungicidal copper compound.

5. A composition as claimed in claim 1 wherein the fungicide is cuprous oxide.

6. A composition as claimed in claim 1 wherein the fungicide is copper oxychloride.

7. A composition as claimed in claim 1 wherein the said salt is present in amount comprising 10% to 20% by weight of the weight of the fungicide.

8. A composition as claimed in claim 1 wherein the long chain aliphatic carboxylic acid is stearic acid.

9. A composition as claimed in claim 1 wherein the volatile base is present in excess over the acid equivalent.

10. A composition consisting essentially of a solid fungicide which is substantially water insoluble and the salt of a volatile base and a long chain aliphatic carboxylic acid which contains from 12 to 18 carbon atoms and containing additionally dinaphthylmethane disulphonate; said volatile base being selected from the group consisting of ammonia, trimethylamine and triethylamine; said acid being selected from the group consisting of saturated acids and acids containing at least two double bonds; and said salt being present in an amount from 2 to 100% by weight of the fungicide.

11. A process for the treatment of plants which comprises spraying the plants with an aqueous suspension consisting essentially of water, a substantially water insoluble solid agricultural chemical and the salt of a volatile base selected from the group consisting of ammonia, trimethylamine and triethylamine, and an acid containing from 12–18 carbon atoms selected from the group consisting of saturated aliphatic carboxylic acid and aliphatic carboxylic acid having at least two double bonds, said salt constituting from 2 to 100% by weight of said agricultural chemical.

12. A process as claimed in claim 11 wherein the agricultural chemical is a fungicide.

References Cited in the file of this patent

UNITED STATES PATENTS

| | | |
|---|---|---|
| 1,807,563 | Bennett | May 26, 1931 |
| 1,890,158 | Lindstaedt | Dec. 6, 1932 |
| 2,089,612 | Kubelka | Aug. 10, 1937 |
| 2,195,696 | Dolman | Apr. 2, 1940 |
| 2,387,336 | Littler | Oct. 23, 1945 |

OTHER REFERENCES

Frear: "Chemistry of the Pesticides," 3rd ed., D. Van Nostrand, Inc., N.Y., 1955, pp. 412 and 413, 416–418, 421 and 422.

Schwartz et al.: "Surface Active Agents," vol. 1, Intersci. Pub., N.Y., 1949, p. 119.